United States Patent [19]

Acampora

[11] 4,232,266
[45] Nov. 4, 1980

[54] TECHNIQUE FOR SHARING A PLURALITY OF TRANSPONDERS AMONG A SAME OR LARGER NUMBER OF CHANNELS

[75] Inventor: Anthony Acampora, Freehold, N.J.

[73] Assignee: Bell Telephone Laboratories, Incorporated, Murray Hill, N.J.

[21] Appl. No.: 939,180

[22] Filed: Sep. 5, 1978

[51] Int. Cl.² ............................................. H04J 3/06
[52] U.S. Cl. ..................................... 370/79; 370/97; 455/12; 455/17
[58] Field of Search ....... 343/100 R, 100 ST, 100 CS, 343/100 SA; 179/15 AD, 15 AQ, 15 BS; 325/3, 4, 14

[56] References Cited

U.S. PATENT DOCUMENTS

| | | | |
|---|---|---|---|
| 3,928,804 | 12/1975 | Schmidt et al. | 179/15 AD |
| 3,997,729 | 12/1976 | Costales et al. | 179/15 AS |
| 4,145,573 | 3/1979 | Arnold | 325/4 |

Primary Examiner—Benedict V. Safourek
Attorney, Agent, or Firm—Erwin W. Pfeifle

[57] ABSTRACT

A technique is disclosed for sharing a fixed number of identical transponders among a same or greater number of input and output signaling directions by rapidly scanning each transponder over appropriately defined group pairs of the input and output directions. The apparatus comprises n transponders having input and output terminals which are selectively and separately scanned over a plurality of m input and output signaling directions, respectively, by scanning means under the control of a controller. The scanning means can comprise separate m × n input and output matrix switches or a separate selectively changeable phase shifter at each antenna element which is connected to a summing and dividing means at the input and output terminal, respectively, of the associated transponder. An efficient TDMA slot assignment technique is also disclosed which covers nonuniform traffic requirements.

10 Claims, 6 Drawing Figures

FIG. 5

(a)
$$T = \begin{array}{|cccc|c|} \hline 3 & ⑥ & 2 & 1 & 12 \\ ⑥ & 4 & 0 & 0 & 10 \\ 0 & 1 & ⑥ & 2 & 9 \\ 2 & 0 & 2 & 4 & 8 \\ \hline 11 & 11 & 10 & 7 & 39 \\ \end{array}$$

→ 5 UNITS →

(b)
$$\begin{array}{|cccc|c|} \hline ③ & 1 & 2 & 1 & 7 \\ 1 & ④ & 0 & 0 & 5 \\ 0 & 1 & 1 & 2 & 4 \\ 2 & 0 & 2 & ④ & 8^* \\ \hline 6 & 6 & 5 & 7 & 24 \\ \end{array}$$

↓ 3 UNITS (c)
$$\begin{array}{|cccc|c|} \hline 0 & 1 & ② & 1 & 4 \\ 1 & 1 & 0 & 0 & 2 \\ 0 & 1 & 1 & ② & 4 \\ ② & 0 & 2 & 1 & 5^* \\ \hline 3 & 3 & 5^* & 4 & 15 \\ \end{array}$$

← 2 UNITS ←

(d)
$$\begin{array}{|cccc|c|} \hline 0 & 1 & 0 & ① & 2 \\ 1 & 1 & 0 & 0 & 2 \\ 0 & ① & 1 & 0 & 2 \\ 0 & 0 & ② & 1 & 3^* \\ \hline 1 & 3^* & 3^* & 2 & 9 \\ \end{array}$$

↓ 1 UNIT (e)
$$\begin{array}{|cccc|c|} \hline 0 & 1 & 0 & 0 & 1 \\ 1 & ① & 0 & 0 & 2^* \\ 0 & 0 & ① & 0 & 1 \\ 0 & 0 & 1 & ① & 2^* \\ \hline 1 & 2^* & 2^* & 1 & 6 \\ \end{array}$$

→ 1 UNIT →

(f)
$$\begin{array}{|cccc|c|} \hline 0 & 1 & 0 & 0 & 1^* \\ 1 & 0 & 0 & 0 & 1^* \\ 0 & 0 & 0 & 0 & 0_* \\ 0 & 0 & 1 & 0 & 1^* \\ \hline 1^* & 1^* & 1^* & 0 & 3 \\ \end{array}$$

FIG. 6

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| TRANSPONDER #1 | UP | 1 | 1 | 1 | 1 | 1 | 1 | 1 | 1 | 1 | 1 | 2 | 1 | |
| | DOWN | 2 | 2 | 2 | 2 | 2 | 1 | 1 | 1 | 3 | 3 | 4 | 2 | 2 |
| TRANSPONDER #2 | UP | 2 | 2 | 2 | 2 | 2 | 2 | 2 | 3 | 3 | 3 | 3 | 2 | |
| | DOWN | 1 | 1 | 1 | 1 | 1 | 2 | 2 | 2 | 4 | 4 | 2 | 3 | 1 |
| TRANSPONDER #3 | UP | 3 | 3 | 3 | 3 | 3 | 4 | 4 | 4 | 4 | 4 | 4 | 4 | |
| | DOWN | 3 | 3 | 3 | 3 | 3 | 4 | 4 | 1 | 1 | 3 | 4 | 3 | |
| TIME SLOTS | | 1 | 2 | 3 | 4 | 5 | 6 | 7 | 8 | 9 | 10 | 11 | 12 | 13 |

⟵ ONE FRAME ⟶

TECHNIQUE FOR SHARING A PLURALITY OF TRANSPONDERS AMONG A SAME OR LARGER NUMBER OF CHANNELS

TECHNICAL FIELD

The present invention relates to a technique for sharing a first plurality of transponders among the same or larger number of input and output signaling directions and, more particularly, to a technique which concurrently and rapidly scans each transponder over appropriately defined group pairs of the input and output signaling directions to match satellite resources with terrestrial traffic patterns.

BACKGROUND ART

The early satellite communication system designs employed an area coverage beam which provided interconnections on either a time-division multiple access (TDMA) basis or a frequency-division multiple access (FDMA) basis. Such designs had the disadvantage of low antenna gain and frequency reuse only by the use of polarization techniques. More recent designs use (a) multiple narrow-angle fixed spot beams with onboard satellite switching to provide frequency reuse, high capacity, and high antenna gain, (b) a single scanning beam to provide high antenna gain, (c) the combination of an area coverage beam and multiple narrow-angle fixed spot beams to provide high capacity, and (d) the combination of multiple narrow-angle fixed spot beams and a single scanning beam with on-board satellite switching.

A typical prior art design is shown in U.S. Pat. No. 3,711,855, issued to W. G. Schmidt et al on Jan. 16, 1973, which illustrates a conventional multiple-transponder satellite with n transponders for n or more ground stations where each transponder covers a particular portion of the frequency spectrum and no two ground stations may concurrently transmit in the same frequency band. Another design is shown in U.S. Pat. No. 3,924,804, issued to W. G. Schmidt et al on Dec. 23, 1975, where a plurality of receive spotbeam antennas are selectively connected to a plurality of transmit spotbeam antennas by an on-board switching matrix. Additionally, several other separate receive and transmit spotbeam antennas are connected to a common receiver and transmitter, respectively, by a respective on-board input and output switch.

An article "Analysis of a Switch Matrix for an SS/TDMA System" by Y. Ito et al in *Proceedings of the IEEE*, Vol. 65, No. 3, March 1977 at pp. 411-419 discloses a technique which provides a most efficient utilization of a frame period with $n^2-n$ numbers of switchings at most, where n is the number of beams in the SS/TDMA system.

A major problem in multibeam satellite design is one of transponder reliability. Unlike area coverage systems wherein the allocated band is divided among several transponders and service is provided via frequency division multiple access, it is desirable to serve each spot beam of a multibeam satellite system with a single transponder. With this approach, the required number of transponders is kept from becoming prohibitive, and the weight of the communications subsystem is minimized. However, sufficient redundancy must be provided to ensure high reliability for each transponder since single failures would preclude continuing service to the area serviced by that transponder. By contrast, for area coverage systems using frequency division multiple access, isolated failures merely cause a slight increase in the demand presented to the surviving transponders.

A second problem in multibeam satellite systems concerns efficient utilization of the satellite transponders. In general, the traffic demands from the various coverage areas, or footprints, are nonuniform. Thus, to utilize each transponder fully, the capacity of each must be tailored to the traffic demand of the area covered by that transponder. A technique for achieving such a custom fit has been disclosed in the article "An Efficient Digital Satellite Technique for Serving Users of Differing Capacities" by H. W. Arnold in *ICC Conference Record*, June 12-15, 1977, Chicago, Ill., Vol. 1, at pp. 6.1-116 to 6.1-120 wherein the bit-rate of each beam is selected as a fixed multiple of some basic rate. At the satellite, each up-link beam is demultiplexed into several basic rate bit streams, switched, and then remultiplexed into down-link beams. One disadvantage of this scheme is that on-board demodulation and remodulation is required. However, a more serious disadvantage in such a system is the need for nonidentical transponders which precludes sharing of a common pool of spare transponders among all beams, and the reliability of the system suffers.

A third problem of multibeam satellites involves means of accessing traffic from areas not within the footprint of some spot beam. Several solutions have been proposed in the article "Spectral Reuse in 12 GHz Satellite Communication Systems" by D. O. Reudink et al in *ICC Conference Record*, June 12-15, 1977, Vol. 3 at pp. 37.5-32 to 37.5-35 involving sharing the spectrum between spot beams and an area coverage beam. These have the disadvantage that the area coverage transponders are different from the spot beam transponders and have higher power requirements to compensate for the loss of antenna gain. Also, the fixed spot beam transponders, when assumed identical, are not matched to traffic requirements of the area served.

Another solution to the access problem as disclosed in the article "A Scanning Spot Beam Satellite System" by D. O. Reudink et al in *Bell System Technical Journal*, Vol. 56, No. 8, October 1977 at pp. 1549-1560 involves the use of a steerable spot beam which can be rapidly scanned across the entire service region via a phased array antenna, thereby providing universal coverage. When used in conjunction with a multitude of fixed spot beams, the resulting hybrid system has the advantages of frequency reuse, high antenna gain, and identical transponders. However, such a hybrid system does not utilize the transponders efficiently because of nonuniform traffic demands from the various ground areas covered.

The problem, therefore, remaining in the prior art is to provide a satellite system concept whereby the resources such as, for example, the available power and transponders at the satellite are most efficiently matched to the instantaneous terrestrial traffic patterns, while providing uniform coverage over a wide service area, with identical or nearly identical transponders.

BRIEF SUMMARY OF THE INVENTION

The foregoing problem has been solved in accordance with the present invention which provides a technique for sharing a plurality of transponders among a same or larger number of input and output signaling directions and, more particularly, to a technique which rapidly scans each transponder over appropriately defined group pairs of the input and output signaling directions to match satellite resources with terrestrial traffic patterns.

It is an aspect of the present invention to provide a technique for providing an efficient TDMA slot assignment sequence for each of a plurality of transponders which accommodates nonuniform ground station traffic requirements by concurrently scanning the transponders over separate group pairs of ground areas.

It is a further aspect of the present invention to provide a technique for sharing a first plurality of transponders among a same or larger number of input and output signaling directions which uses apparatus comprising scanning means which concurrently and selectively scans the input and output terminals of the transponders over appropriately defined group pairs of the input and output signaling directions as defined by a predetermined TDMA slot assignment sequence for each transponder.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 5 is an illustrative reduction of a 4-by-4 traffic matrix by removing more than one unit of capacity per diagonal at a time where the matrix comprises 39 units of traffic and there are 3 transponders each of a capacity of 13, in accordance with the present invention; and FIG. 6 is a TDMA frame assignment sequence for the exemplary reduction of FIG. 5.

DETAILED DESCRIPTION

Figure 1:
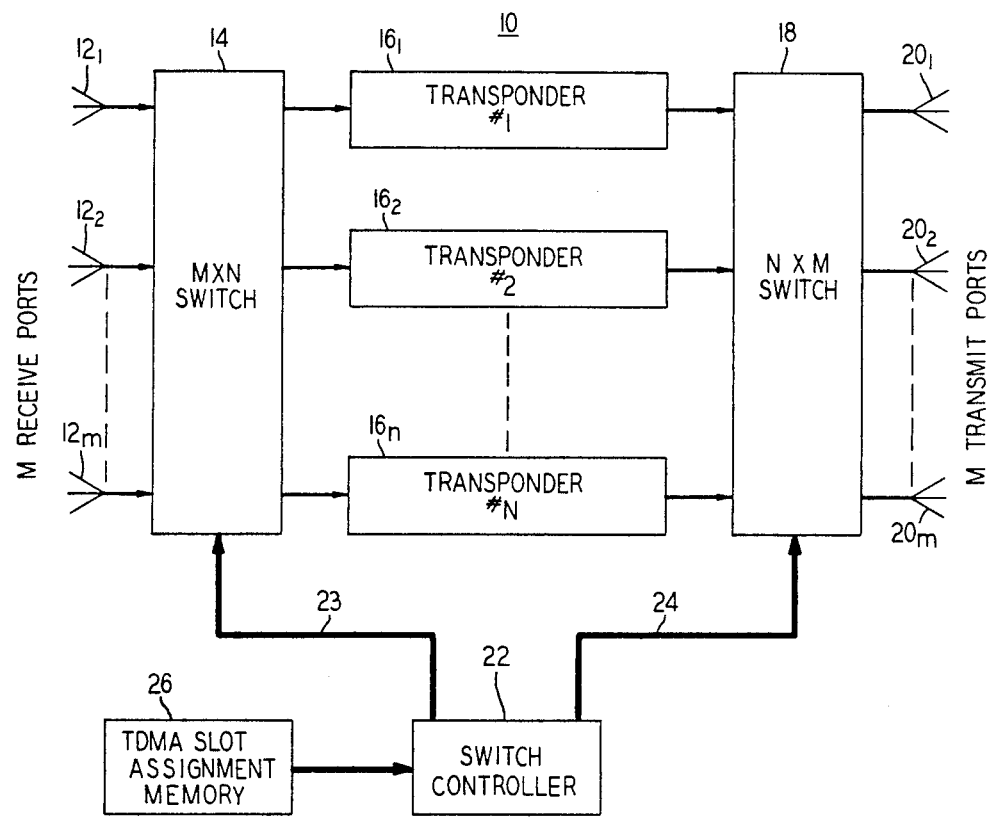
FIG. 1 is a block diagram of a satellite communication subsystem arrangement for the rapid scanning of n multiple transponders over appropriately defined group pairs of a plurality of m input and output signaling directions in accordance with the present invention.

FIG. 1 illustrates a block diagram of a TDMA satellite communication subsystem arrangement 10 in accordance with the present invention. The subsystem arrangement 10 is shown as comprising a plurality of m receive ports $12_1$-$12_m$, each connected to a separate one of the m inputs of a first m by n microwave matrix switching means 14. A plurality of n transponders $16_1$-$16_n$, where $n \leq m$, are connected at their inputs to a separate one of the n outputs of m by n switching means 14 and at their outputs to a separate one of the n inputs of a second n by m microwave matrix switching means 18. The m outputs of switching means 18 are each, in turn, connected to a separate one of a plurality of m transmit ports $20_1$-$20_m$. A switch controller 22 provides control signals on buses 23 and 24 to a first and second switching means 14 and 18, respectively, to cause the appropriate concurrent interconnection of the appropriate ones of the m receive ports $12_1$-$12_m$ and m transmit ports $20_1$-$20_m$ to the inputs and outputs, respectively, of transponders $16_1$-$16_m$ in accordance with a repetitive TDMA slot assignment sequence stored in a memory 26. The time slot assignment memory can be updated, as appropriate, by a telemetry link (not shown) to provide a different TDMA sequence whenever changes in terrestrial traffic patterns among the m spot beam footprints arise. In each case, an efficient switching sequence is stored in memory 26.

In accordance with the present invention, transponders $16_1$-$16_n$ can advantageously be identical transponders of a suitable type which are commercially available. Similarly, first and second switching means 14 and 18, switch controller 22 and memory 26 can comprise any suitable arrangement which is commercially available. Each of the m receive and transmit ports will be hereinafter considered to include circuitry such as, for example, antenna means, etc. capable of receiving signals from a separate one of the m remote and spaced-apart ground areas and delivering such signals in proper form via first switching means 14 to the interconnected transponders $16_1$-$16_n$, and for appropriately transmitting the signals from transponders $16_1$-$16_n$ delivered via second switching means 18 to be appropriately coupled transmitting ports $20_1$-$20_m$ for concurrent transmission to n separate ones of the m ground areas, respectively.

Figure 2:
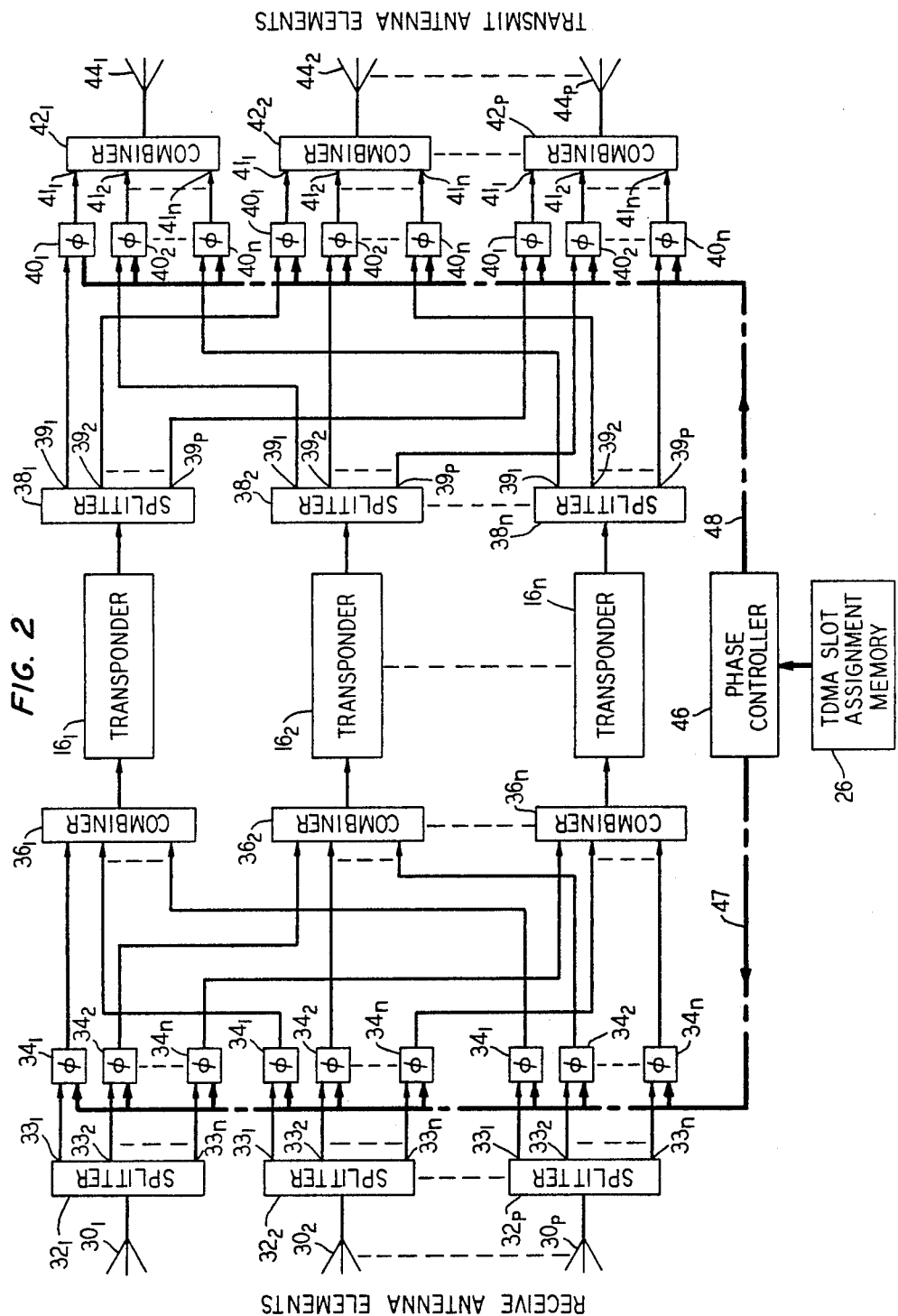
FIG. 2 is a block diagram of an alternative arrangement of the subsystem of FIG. 1 in accordance with the present invention.

FIG. 2 is a block diagram of an alternative arrangement for the subsystem arrangement 10 shown in FIG. 1. In the alternative arrangement of FIG. 2, a plurality of p receive antenna elements $30_1$-$30_p$ are each connected to a separate one of a plurality of p splitter circuits designated $32_1$-$32_p$. For the arrangement of FIG. 2, each receive antenna elements $30_1$-$30_p$ is capable of intercepting signals from the m separated and spaced-apart ground areas and the elements $30_1$-$30_p$ effectively are the elements of a phased array antenna. Each splitter circuit $32_1$-$32_p$ is shown as comprising one input terminal connected to the associated receive antenna element 30 and a plurality of n output terminals $33_1$-$33_n$ and functions to deliver a 1/n part of the input signal to each of the output terminals $33_1$-$33_n$.

The plurality of n output terminals $33_1$-$33_n$ of each splitter circuit 32 are connected to the individual inputs of a plurality of n phase shifters $34_1$-$34_n$, respectively. More particularly, the output terminals $33_1$ and $33_2$ of each of splitter circuits $32_1$-$32_p$ are connected to the inputs of phase shifters $34_1$ and $34_2$, respectively, in the group of n phase shifters $34_1$-$34_n$ associated with each of splitter circuit 32. The remaining output terminals $33_3$-$33_n$ of each of splitter circuits $32_1$-$32_p$ are similarly connected to phase shifters $34_3$-$34_n$, respectively, in the associated group of phase shifters 34. The outputs of the corresponding phase shifters 34 in each group of n phase shifters $34_1$-$34_n$ are connected to separate inputs of a separate one of a plurality of n combiner circuits $36_1$-$36_n$. For example, the outputs from each phase shifters $34_1$ in each group of phase shifters $34_1$-$34_n$ associated with each of splitter circuits $32_1$-$32_p$ is connected to a separate one of p inputs of combiner circuit $36_1$. Similarly, the output from each of the corresponding ones of phase shifters $34_2$-$34_n$ is connected to a separate one of the p inputs of combiner circuits $36_2$-$36_n$, respectively. Combiner circuits $36_1$-$36_n$ function to combine the p input signals from the interconnected phase shifters 34 and deliver the resultant combined signal to transponders $16_1$–$16_n$, respectively.

The output from each of transponders $16_1$–$16_n$ is delivered to the input of a separate one of splitter circuits $38_1$–$38_n$. For example, the output of transponder $16_1$ is delivered to the input of splitter circuit $38_1$, the output of transponder $16_2$ is delivered to the input of splitter circuit $38_2$, etc. Each of splitter circuits $38_1$–$38_n$ have a single input from the associated transponder 16 and a plurality of p output terminals $39_1$–$39_n$ and function to deliver 1/n part of the input signal from the associated transponder 16 to each of the n output terminals 39.

The transmit antenna is shown as comprising a plurality of p antenna elements, designated $44_1$–$44_p$, which effectively form a phased antenna array wherein each element 44 is capable of transmitting signals to any one of the m spaced-apart remote ground areas (not shown). Each one of the transmit antenna elements $44_1$–$44_p$ is connected to the output of a separate one of a plurality of p combiner circuits $42_1$–$42_p$. Each combiner circuit 42 also includes a plurality of n input terminals $41_1$–$41_n$ which terminals are connected to the outputs of a separate group of n phase shifters $40_1$–$40_n$, respectively, the combiner circuit functioning to combine the input signals from phase shifters $40_1$–$40_n$ of the associated group of phase shifters into a single output signal to the associated antenna element 44. The outputs $39_1$–$39_n$ of each of splitter circuits $38_1$–$38_n$ are connected to separate corresponding ones of the phase shifters 40 in each group of n phase shifters associated with combiner circuits $42_1$–$42_p$. For example, the output terminals $39_1$–$39_n$ of splitter circuit $38_1$ are connected to separate ones of the corresponding phase shifters $40_1$ in each of the groups of phase shifters $40_1$–$40_n$ associated with combiner circuits $42_1$–$42_p$.

A phase controller 46 generates a sequence of separate concurrent control signals to (a) corresponding ones of phase shifters $34_1$–$34_n$ via a bus 47, and (b) corresponding ones of phase shifters $40_1$–$40_n$ via a bus 48. The sequence of the control signals to each of the corresponding ones of the phase shifters 34 and 40 in each group of phase shifters is generated from a predetermined TDMA slot assignment sequence stored in a TDMA slot assignment memory 26. As stated hereinbefore, the stored sequence can be updated via a telemetry link (not shown) to maintain efficiency of transponder utilization as terrestrial traffic patterns change.

As is well known in the art, a TDMA frame consists of a plurality of sequential time slots, each time slot representing one unit of traffic to be exchanged between a transmitting and a receiving ground area or station assigned thereto. The time slots in each frame sequence are selectively assigned to various paired transmitting and receiving ground area or station combinations dependent on the traffic requirement therebetween. Since each transponder 16 is capable of handling a separate repetitive frame sequence, n such separate frame sequences can be concurrently processed in the arrangements of FIGS. 1 and 2 to accommodate the nonuniform traffic requirements between the m remote and spaced-apart ground areas. The operation of FIGS. 1 and 2 will be described after a method for deriving a TDMA slot arrangement sequence is developed.

Since $n \leq m$, a TDMA slot assignment sequence must be predetermined which will permit only n of the m ground areas to simultaneously transmit one unit of traffic via the arrangements of either FIG. 1 or 2 to n destination ground areas and still accommodate the nonuniform traffic requirements between all ground areas. This predetermined TDMA slot sequence is then stored in memory 26 and all ground stations and the FIGS. 1 and 2 arrangements are frame synchronized by any suitable technique known in the art.

To enable frequency reuse via a multibeam satellite system employing n identical transponders $16_1$–$16_n$ such that all transponders 16 are used at maximum efficiency and a uniform grade of service is provided over the service area, the present invention uses a generalization upon the scanning beam approach and a TDMA slot assignment sequence will now be developed to better understand the operation of the arrangements of FIGS. 1 and 2.

In the arrangements of FIGS. 1 and 2, a satellite employing n identical wideband transponders are shown, each of which will be considered to have a capacity or throughput of C units of traffic per frame. The parameters of the satellite antenna 12 and 20 of FIG. 1 or 30 and 44 of FIG. 2 and the resulting beam width determine the number m of distinct footprints or ground areas needed to provide service anywhere throughout the required service area.

The system traffic can be represented by a matrix $[t_{ij}]$ as shown:

$$[t_{ij}] = \begin{bmatrix} t_{11} & t_{12} & \cdots & t_{1M} \\ t_{21} & t_{22} & \cdots & t_{2M} \\ \vdots & & & \\ t_{M1} & t_{M2} & \cdots & t_{MM} \end{bmatrix}, \quad (1)$$

the element $t_{ij}$ represents the traffic originating in ground area i and destined for somewhere in ground area j. Each footprint might contain several ground stations, so $t_{ij}$ represents the sum of the traffic from all stations within ground area i which is directed to stations within ground area j.

It is to be understood that it is not necessary that the traffic matrix be symmetric and that a loop-back feature is possible. For example, it is not required that $t_{ij} = t_{ji}$ or that $t_{ii} = 0$ but it is understood that $t_{ij} \geq 0$.

Two requirements must be imposed on the traffic matrix $[t_{ij}]$. First, since the total capacity of the satellite is equal to nC (n transponders $16_1$–$16_n$ each of capacity C), it is required that:

$$T = \sum_{i=1}^{m} \sum_{j=1}^{m} t_{ij} \leq nC. \quad (2)$$

The second requirement is that the traffic originating from or destined for a particular ground area should not exceed the capacity of one transponder 16, i.e., $$\text{Row sum } R_i = \sum_{j=1}^{m} t_{ij} \leq C, \, i = 1, 2, \ldots m, \quad (3)$$

$$\text{Column sum } S_j = \sum_{i=1}^{m} t_{ij} \leq C, \, j = 1, 2, \ldots m. \quad (4)$$

The transponders $16_1$–$16_n$ are utilized with 100 percent efficiency when equation (2) is satisfied as an equality. This equation may be interpreted as establishing the minimum number n of transponders required. Conditions (3) and (4) are necessary because no two transponders can be connected to a common spot beam, either up-link or down-link, on a noninterfering basis.

If the total offered traffic equals the sum of the transponder capacities, there is the potential for 100 percent utilization. The discussion which follows will show that it is possible, in accordance with the present invention, to interconnect the various up-link beams, transponders, and down-link beams such that this is achieved. Maximum utilization is done on a time division basis by enabling each of the n transponders $16_1$-$6_n$ to access any of the m possible receive (up-link) beam signals, received by receive ports $12_1$-$12_m$ of FIG. 1 or antenna elements $30_1$-$30_p$ and appearing at the output of phase shifters 34 in FIG. 2, and any of the m possible transmit (downlink) beam signals to the m ground areas transmitted by transmit ports $20_1$-$20_m$ of FIG. 1 or antenna elements $44_1$-$44_p$ associated with phase shifters 40 of FIG. 2.

To achieve such assignment it must be understood that, by definition, a diagonal of a matrix $[t_{ij}]$ is a K-tuple $D=\{d_1, d_2, \ldots, d_k\}$ where each member is a nonzero element of the matrix and no two elements appear in the same row or same column of the matrix. The length of the diagonal is K, where K is the number of elements, and the diagonal is said to cover the K rows and K columns from which the elements are taken. It can be proven that in a traffic matrix $[t_{ij}]$ for which $$T = \sum_{i=1}^{m} \sum_{j=1}^{m} t_{ij} = nC$$

and for which no row or column sum exceeds C, a diagonal of length n exists which covers all rows and columns which sum to C exactly, if any. This latter provable statement will hereinafter be referred to as the theorem. For convenience it will be assumed that the elements $t_{ij}$ of the traffic matrix are integers, representing the traffic as multiples of some basic unit such as, for example, one voice channel.

Traffic shall be assigned, in accordance with the present technique, to the various transponders $16_1$-$16_n$ as follows: Let the TDMA frame sequence consist of C time slots, each representing one unit of traffic. There are n such frame sequences, one belonging to each of the n transponders. In the traffic matrix $[t_{ij}]$, select a diagonal of length n from matrix T which covers all rows and columns summing to C, if any. The theorem guarantees this is always possible. From these n diagonal elements extract one unit of traffic from each and assign one unit of each of the n transponders $16_1$-$16_n$. Since the traffic assigned to the transponders $16_1$-$16_n$ for this time slot originates from different up-link beams and are directed to different down-link beams, the traffic has been assigned on a noninterfering basis.

Since n units of traffic have been removed from the matrix, the reduced matrix has a total traffic of $nC-n=n(C-1)$ units. Furthermore, each transponder 16 has $C-1$ units of traffic carrying capacity left, and no row or column of the reduced matrix sums to more than $C-1$. The latter is true because every row and column which summed to C in the original matrix has had one unit of traffic removed because of the way the diagonal was constructed.

At this stage, the same situation occurs as was started with except that $C-1$ replaces C. By the same technique, another n units of traffic are assigned to the next time slot for each of transponders $16_1$-$16_n$ and the result is a matrix having traffic remaining equal to $n(C-2)$ in which no row or column sums to more than $C-2$. Each of transponders $16_1$-$16_n$ has then $C-2$ time slots unallocated. Hence, this procedure is repeated until all transponder time slots are used and no traffic remains unallocated. Thus the nonuniform demands of a traffic matrix can be met by n identical transponders each operating at 100 percent utilization efficiency.

Figure 3:
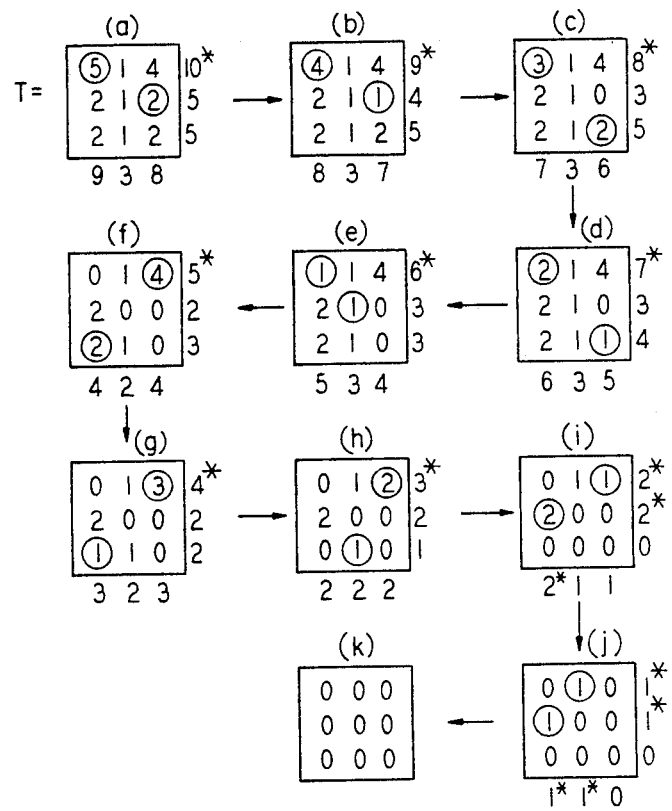
FIG. 3 is an illustrative reduction of a 3-by-3 traffic matrix comprising 20 units of traffic for two transponders each of a capacity of 10 traffic units per frame in accordance with the present invention.
Figure 4:
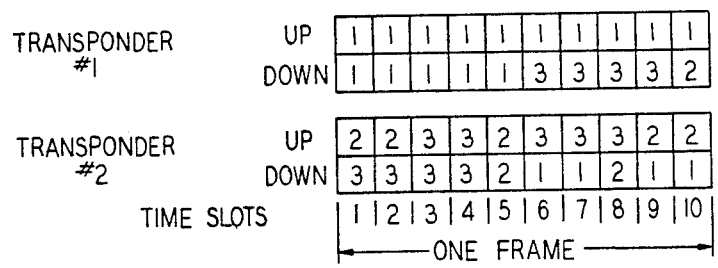
FIG. 4 is a TDMA frame assignment sequence for the exemplary reduction of FIG. 3 where the numbers 1 through 3 represent the spot beam coverage areas of the 3-by-3 traffic matrix.

An example of a TDMA slot assignment sequence is shown in FIGS. 3 and 4, which sequence is drawn for m=3 remote spaced-apart ground areas, n=2 transponders, and C=10 time slots per frame. Shown in FIG. 3 are the stages in the matrix reduction in accordance with the hereinbefore described steps where diagonal elements chosen are circled and rows or columns which sum to C or the reduced value of C are marked with an asterisk. FIG. 4 illustrates the resulting TDMA frame sequences for transponders 1 and 2 obtained from the matrix reduction stages of FIG. 3. In FIG. 3 the predetermined nonuniform traffic requirements between all combinations of the three remote spaced-apart ground areas are shown in the matrix at the upper left hand corner and designated (a).

In accordance with the hereinabove described procedure, row 1 is the only row which sums to C, or 10, and, therefore, one unit of traffic will be arbitrarily assigned therefrom to time slot 1 of, for example, transponder 1. Although it is shown in FIG. 3 that one unit will be chosen from the five units of traffic needed between ground stations in area 1, it is to be understood that any of the one traffic units required between ground stations in area 1 and area 2 or four traffic units required between ground stations in area 1 and area 3 could have alternatively been chosen since none of the columns also totalled to the value C, or 10. However, having chosen the matrix element from which a traffic unit is to be extracted, the second or $n^{th}$ unit of traffic will be obtained from a diagonal element. In matrix (a) of FIG. 3 this diagonal element must come from one of the elements not forming row 1 or column 1 from which the first traffic unit was extracted. As is shown, a traffic unit between ground stations in area 2 and 3 was selected for assignment to transponder 2, although any one of the other three diagonal elements could have been used to extract such traffic unit since they were all nonzero elements.

A consideration which may be used, although certainly not mandatory, is to choose traffic elements from the element of the row and column having the highest combined value. For example, in matrix (a) of FIG. 3, once row 1 was selected the element in column 1 was used to extract the traffic unit because the combined traffic demands of row 1 and column 1 totalled 19 which is higher than the combined totals of row 1 and either one of columns 2 or 3.

Since one traffic unit was extracted from matrix (a) the resulting matrix is shown in matrix (b) of FIG. 3. The process of extracting n, or 2, more units of traffic is similarly performed as described above for matrix (a) except that rows or columns totalling $C-1$, or 9, will be chosen. The procedure is repeated through matrices (c) to (j) until no traffic requirements remain unassigned, as shown in matrix (k) of FIG. 3. The selected traffic unit sequence shown in matrices (a) to (j) of FIG. 3 can be directly correlated to the TDMA slot assignment sequence for time slots 1-10 of transponders 1 and 2 shown in FIG. 4, where the numbers in each time slot for each transponder correspond to the up-link and down-link service regions interconnected by that transponder for that time slot.

It must be understood that although the method described was for a matrix for which equation (2) was satisfied as an equality (i.e., $T=nC$), it also applies to a matrix for which $T \leq nC$, because such a matrix can always be padded with dummy traffic until $T=nC$. The assignments corresponding to the dummy traffic can be ignored, and simply reflect the fact that the available transponder capacity exceeds the demand.

The assignments are not unique and it may be possible to extract more than one unit of capacity per diagonal element at a time. This is desirable from a practical point of view as it minimizes the number of times the switches 14 and 18 of FIG. 1 or the phase shifters 34 and 40 of FIG. 2 have to be reconfigured during one frame period. To achieve this, it seems desirable to choose the n diagonal elements from large elements in the rows and columns with the largest sums, if possible. The maximum traffic extractable, however, is $t = \min(t_1, t_2)$ where $t_1$ = smallest element on the diagonal and $C - t_2$ is the largest row or column sum among the rows and columns not covered by the diagonals.

As an example consider the matrix below with $m=4$, $n=3$ and $C=13$;

|  |  | Down-link beam j | | | | |
|---|---|---|---|---|---|---|
|  | $t_{ij}$ | 1 | 2 | 3 | 4 | $R_i$ |
| Up-link | 1 | 3 | 6 | 2 | 1 | 12 |
| beam | 2 | 6 | 4 | 0 | 0 | 10 |
| i | 3 | 0 | 1 | 6 | 2 | 9 |
|  | 4 | 2 | 0 | 2 | 4 | 8 |
|  | $S_j$ | 11 | 11 | 10 | 7 | 39 = T |

FIG. 5 illustrates successive reductions of this matrix as the traffic is assigned to the three transponders. As in FIG. 3, the diagonal elements chosen are circled and the rows and columns which sum to the reduced value of C, if any, are marked with an asterisk. In FIG. 5, 6 units of traffic are available from the diagonals chosen in matrix (a) but only 5 units are selected therefrom since, as was stated hereinbefore, the maximum traffic extractable is the smaller of either $t_1$, the smallest element on the diagonal, which equals 6 or $C-t_2$, the largest capacity of the row or column of the rows or columns not covered by the diagonal elements chose, which equals 13-8 or 5 and is here determinative. The corresponding traffic assignments to each of the three transponders is shown in FIG. 6 and requires but six changes in the switching means 14 and 18 configuration of FIG. 1 or phase shifters 34 and 40 of FIG. 2.

The traffic assignments once determined as shown for example in either FIGS. 4 or 6 are stored in TDMA slot assignment memory 26 in the arrangements of either FIGS. 1 or 2 prior to the system being turned on. It is to be understood that such traffic assignments can be subsequently changed via telemetry signals (not shown) to accommodate traffic changes or transponder failure.

In operation, all ground stations and the arrangements of FIGS. 1 and 2 are first frame synchronized. Once synchronized, the various ground stations transmit bursts of information in their assigned time slots. In the arrangement of FIG. 1 switch controller 22 concurrently transmits control signals on buses 23 and 24 to switching means 14 and 18, respectively, to connect the concurrently received n bursts of information at n of the m receive ports 12 through the correct predetermined transponders $16_1$-$16_n$ for retransmission via the correct n of m transmit ports 20 in accordance with the frame sequence stored in memory 26.

In the arrangement of FIG. 2, the n bursts of information from n separate directions are received by each of the receive antenna elements $30_1$-$30_p$. The signals received at each element 30 are split into n equal parts by an associated splitter 32 and applied to separate ones of associated phase shifters $34_1$-$34_n$. Phase controller 46, in response to the frame sequences stored in memory 26 transmits separate control signals on bus 47 to each group of corresponding phase shifters $34_1, 34_2, \ldots, 34_n$ in the p groups of phase shifters to match the phase thereof with a separate one of the n signal directions concurrently received in a manner well known in the art. The corresponding phase shifters in each group of phase shifters $34_1$-$34_n$, therefore, effectively pass the same one of n signals received by receive elements $30_1$-$30_p$ to the associated combiner 36 and then to the transponder 16 associated therewith in accordance with the stored frame sequences. Phase controller 46 similarly transmits separate control signals on bus 48 to corresponding phase shifters 40 in the p groups of phase shifters $40_1$-$40_n$ to apply the proper phase to each signal from the associated transponder 16 to cause transmit antenna elements $44_1$-$44_p$ to transmit the signals in the proper directions to the destined ground stations in accordance with the n stored frame sequences.

Although the system described has been presented in terms of subdividing the transponder capacity by time division, it is applicable to any other method of subdividing the transponder capacity, e.g., by frequency division or a combination of time and frequency division. In a frequency division system the smallest subdivision unit of capacity would usually be larger than for a time division system and transponder linearity would be an important consideration as far as crosstalk is concerned. The TDMA system concept presented hereinbefore can be seen to employ n multiple scanning beams affording both the wide coverage associated with area beams and the high antenna gains of spot beams. High capacity is achieved by means of multiple spot beams and frequency reuse with all transponders 16 being able to be identical and occupy the entire bandwidth. By appropriate time division interconnection between the satellite transponders 16 and the spot beam antennas, high transponder utilization efficiency is achieved for the various nonuniform traffic requirements of the system's ground stations.

It is to be understood that the abovedescribed embodiments are simply illustrative of the principles of the invention. Various other modifications and changes may be made by those skilled in the art which will embody the principles of the invention and fall within the spirit and scope thereof.

I claim:

1. An on-board satellite switching subsystem comprising:
   first antenna means ($12_1$-$12_n$, FIG. 1; $30_1$-$30_p$, FIG. 2) capable of receiving during a frame period bursts of information in a time division multiplexed (TDM) mode from each of a plurality of m ground areas destined for either one of the same and other ones of said ground areas;
   second antenna means ($20_1$-$20_n$, FIG. 1; $44_1$-$44_p$, FIG. 2) capable of transmitting the bursts of information received by said first antenna means toward the destined ground areas; and switching means (14, $16_1$-$16_n$, 18, 22, FIG. 1; $16_1$-$16_n$, $34_1$-$34_n$, $40_1$-$40_n$, 46, FIG. 2) capable of selectively transferring the received bursts of information between the first and second antenna means for appropriate transmission to the destined ground areas

CHARACTERIZED IN THAT the switching means comprises a plurality of n transponders ($16_1$-$16_n$), where n≦m;

first directing means (14, FIG. 1; $34_1$-$34_n$, FIG. 2) capable of selectively routing n concurrently received bursts of information from the m ground areas to separate ones of the n transponders;

second directing means (18, FIG. 1; $40_1$-$40_n$, FIG. 2) capable of selectively routing said n concurrent bursts of information from the n transponders to the second antenna means to permit appropriate transmission of said n bursts of information to the n of m destined ground areas; and a controller (22, FIG. 1; 46, FIG. 2) coupled to the first and second directing means capable of generating a predetermined repetitive sequence of control signals which are capable of causing the selective routing of the n currently received bursts of information in each portion of the repetitive sequence through the first and second directing means to the n transponders such that nonuniform traffic requirements of the m ground areas are accommodated and the n transponders are efficiently utilized during each repetitive sequence.

2. The on-board satellite switching subsystem according to claim 1 wherein the first antenna means comprises m antenna elements ($12_1$-$12_m$, FIG. 1) each element being directed towards a separate one of the m ground areas

CHARACTERIZED IN THAT the first directing means (14, FIG. 1) comprises a microwave switching matrix including m input terminals and n output terminals; each input terminal being coupled to a separate one of the m elements ($12_1$-$12_m$) of the first antenna means and each output terminal being coupled to the input of a separate one of the n transponders ($16_1$-$16_n$).

3. The on-board satellite switching subsystem according to claim 1 or 2 wherein the second antenna means comprises m antenna elements ($20_1$-$20_m$), each element being directed towards a separate one of the m ground areas

CHARACTERIZED IN THAT the second directing means (18, FIG. 1) comprises a microwave switching matrix including n input terminals and m output terminals, each input terminal being coupled to the output of a separate one of the n transponders ($16_1$-$16_n$) and each output terminal being connected to a separate one of the m elements ($20_1$-$20_m$) of the second antenna means.

4. The on-board satellite switching subsystem according to claim 1 wherein the first antenna means comprises p antenna elements ($30_1$-$30_p$), each antenna element being capable of receiving signals from the m ground areas

CHARACTERIZED IN THAT the first directing means comprises a plurality of p splitter means ($32_1$-$32_p$), each splitter means comprising an input terminal connected to a separate one of the plurality of p antenna elements ($30_1$-$30_p$) of the first antenna means and a plurality of n output terminals ($33_1$-$33_n$) and being capable of delivering a 1/n part of an input signal to each of said n output terminals, a plurality of p groups of n phase shifting means ($34_1$-$34_n$), each group of phase shifting means being associated with a separate one of the plurality of p splitter circuits and each phase shifting means in each group having an input thereof coupled to a separate one of the n output terminals of the associated splitter circuit, and a plurality of n combining means ($36_1$-$36_n$), each combining means comprising p input terminals coupled to separate outputs from separate corresponding ones of the phase shifting means ($34_1$, $34_2$, . . . , $34_n$) in each of the p groups of phase shifting means and an output terminal coupled to the input of a separate one of the n transponder and being capable of combining the p input signals from the corresponding phase shifting means into one composite output signal; and the controller (46) is further capable of generating separate and concurrent control signals to each group of corresponding phase shifting means in the p groups of n phase shifting means for causing each of the n groups of corresponding phase shifting means to form a beam for reception of signals from a separate one of the m ground areas.

5. The on-board satellite switching subsystem according to claim 1 or 4 wherein the second antenna means comprises p antenna elements ($44_1$-$44_p$), each antenna element being capable of transmitting signals to the m ground areas

CHARACTERIZED IN THAT the second directing means comprises a plurality of p combining means ($42_1$-$42_p$), each combining means comprising a plurality of n input terminals and an output terminal which is connected to a separate one of the plurality of p antenna elements of the second antenna means, and being capable of combining n input signals into one composite output signal, a plurality of p groups of n phase shifting means ($40_1$-$40_n$), each group of phase shifting means being associated with a separate one of the plurality of p combining means and each phase shifting means in each group comprising an input terminal and an output terminal which is coupled to a separate one of the n input terminals of the associated combining means, and a plurality of n splitter means ($38_1$-$38_n$), each splitter means comprising an input terminal coupled to the output of a separate one of the n transponders ($16_1$-$16_n$) and a plurality of p output terminals ($39_1$-$39_p$) coupled to the inputs of separate corresponding ones of the phase shifting means ($40_1$, $40_2$, . . . , $40_n$) in each of the p groups of phase shifting means, and being capable of delivering a 1/p part of an input signal to each of said p output terminals; and the controller (46) is further capable of generating separate and concurrent control signals to each group of corresponding phase shifting means ($40_1$, $40_2$, . . . , $40_n$) in the p groups of n phase shifting means for causing each of the n groups of corresponding phase shifting means to form a separate beam for transmission of signals to a separate one of the n of m destination ground areas.

6. The on-board satellite switching subsytem according to claim 1

CHARACTERIZED IN THAT
the first and second directing means selectively causes each of the plurality of n transponders to be rapidly scanned over appropriately defined group pairs of the m ground areas in response to the predetermined repetitive sequence of control signals generated by said controller.

7. The on-board satellite switching subsystem according to claim 1 or 6
CHARACTERIZED IN THAT
the first and second antenna means each form a plurality of n concurrent steerable spot beams, each steerable spot beam being scanned over selected group pairs of the m ground areas in correspondence with the selective routing of signals in said steerable spot beam through the first and second directing means and transponders by the predetermined repetitive sequence of control signals generated by said controller.

8. The on-board satellite switching subsystem according to claim 1, 2, or 4 wherein the total system traffic does not exceed nC unts of capacity, and the total traffic to or from any one of the ground areas does not exceed C units of capacity
CHARACTERIZED IN THAT
the subsystem further comprises a memory (26) capable of storing n time division multiple access (TDMA) frame sequences which are concurrently accessible by said controller for generating said predetermined repetitive sequence of control signals, each frame sequence being associated with a separate one of the n transponders and comprising C sequential time slots with each time slot being assigned one unit of the system traffic, the system traffic being assigned by reducing a m-by-m matrix where each element, $t_{ij}$, thereof represents the traffic originating in ground area i and destined for a ground area j by finding a diagonal of length n which covers all rows and columns of the matrix which sum to C and if none sum to C those rows or columns which have the nearest lower value where a diagonal is defined as a set of nonzero elements of the matrix such that no two elements occupy the same row or column, extracting one unit of traffic from each of the n diagonal elements and assigning each unit to a separate corresponding one of the time slots of the n frame sequences, and repeating the matrix reduction C−1 more times where the value of C used for obtaining diagonal elements in each repetition shall equal C−x, where x is the number of times the matrix has been reduced.

9. The on-board satellite switching subsystem according to claim 8
CHARACTERIZED IN THAT
the memory is further capable of being updated to respond in real time to changes in said traffic matrix for altering the TDMA frame sequence time slot assignments and, in turn, the repetitive sequence of control signals generated by said controller.

10. A method of arbitrarily assigning the nonuniform traffic requirements between each of the grouped pairs of a plurality of m remote and spaced-apart ground areas of a satellite communication system to each of a plurality of n concurrent and synchronized repetitive time division multiple access (TDMA) frame sequences where n ≦ m, each frame sequence comprises C sequential time slots, the total system traffic does not exceed nC units of capacity, and the total traffic to or from any one of the ground areas does not exceed C units of capacity, the method comprising the step of:

(a) representing the system traffic requirements by an m-by-m matrix having the form $$[t_{ij}] = \begin{bmatrix} t_{11} & t_{12} & \cdots & t_{1M} \\ t_{21} & t_{22} & \cdots & t_{2M} \\ \cdot & & & \\ \cdot & & & \\ \cdot & & & \\ t_{M1} & t_{M2} & \cdots & t_{MM} \end{bmatrix}$$

where the individual elements $t_{ij}$ in the matrix represent units of traffic requirement originating in ground area i and destined for ground area j
CHARACTERIZED IN THAT
the method comprises the further steps of:
(b) locating all rows and columns of the matrix which individually sum to C, and if none sum to C those rows or columns which have the nearest lower value;
(c) finding a diagonal of the matrix of length n which includes one element $t_{ij}$ of each of the rows and columns located in step (b) and additionally any other arbitrarily chosen elements $t_{ij}$ from any of the remaining rows and columns to provide a diagonal of n elements, a diagonal being defined as a set of nonzero elements $t_{ij}$ of the matrix such that no two elements of the diagonal occupy the same row or column of the matrix;
(d) reducing each of the n diagonal elements found in step (c) by one unit of traffic requirement and assigning each unit of traffic requirement taken from the diagonal elements to a separate corresponding one of the time slots of the n frame sequence; and
(e) reiterating steps (b) to (d) C−1 times wherein the value of C used in the reiteration of step (b) shall equal C−x, where x is the number of times step (b) is reiterated.

\* \* \* \* \*